United States Patent

[11] 3,585,619

[72] Inventors George R. Cogar
Frankfort;
Torkjell Sekse, Marcy; Walter Banziger, Utica; Joseph W. Ming, Utica; Laszlo Horvath, Ilion, all of, N.Y.

[21] Appl. No. 792,900
[22] Filed Jan. 14, 1969
[45] Patented June 15, 1971
[73] Assignee Mohawk Data Sciences Corporation
Herkimer, N.Y.
Division of Ser. No. 541,450, Mar. 30, 1966, Pat. No. 3,483,523.

[54] MAGNETIC TAPE READOUT SYSTEM WITH MEANS TO GENERATE ARTIFICIAL SIGNALS
9 Claims, 3 Drawing Figs.

[52] U.S. Cl. .......... 340/174.1, 226/9
[51] Int. Cl. .......... G11b 5/02, G11b 5/44
[50] Field of Search .......... 340/174.1, 174 A, 174 B, 174 H; 226/134, 5, 6, 9, 120

[56] References Cited

UNITED STATES PATENTS

| | | | |
|---|---|---|---|
| 3,123,810 | 3/1964 | Strauch, Jr. et al. | 340/174.1 |
| 3,209,268 | 9/1965 | Fraunfelder et al. | 340/174.1 |
| 3,243,580 | 3/1966 | Welsh | 340/174.1 |
| 3,271,750 | 9/1966 | Padalino | 340/174.1 |
| 3,275,208 | 9/1966 | Poumakis | 226/134 |
| 3,405,402 | 10/1968 | Smith-Uaniz | 226/120 |

*Primary Examiner*—Bernard Konick
*Assistant Examiner*—Vincent P. Canney
*Attorneys*—Francis J. Thomas, Richard H. Smith, Thomas C. Siekman and Sughrue, Rothwell, Mion, Zinn and MacPeak

ABSTRACT: A magnetic tape readout system for reading blocks of data on a magnetic tape. Each block contains a predetermined number of characters and is read during an individual read cycle. The characters are counted as they are read to determine the end of each cycle and, where no data is sensed, a series of artificial data signals are generated and counted in place of the missing characters. These artificial pulses allow the read cycle to be terminated in this situation before the next successive data block arrives at the read station.

GEORGE R. COGAR
TORKJELL SEKSE
WALTER BANZIGER
JOSEPH W. MING
LASZLO HORVATH
INVENTORS.

BY Richard H. Smith
Attorneys

MAGNETIC TAPE READOUT SYSTEM WITH MEANS TO GENERATE ARTIFICIAL SIGNALS

This is a division of application Ser. No. 541,450, filed on Mar. 30, 1966, now U.S. Pat. No. 3,483,523.

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines—a card punch and a key verifier—have usually been used to record information in computer systems. In the data recorder in which the invention is utilized business and scientific data can be manually recorded and verified on magnetic tape without the need for any intermediate medium.

The data recorder can operate in either an entry mode or a verify mode, and format programming flexibility is provided for each. In addition, a search mode permits location of any specific block of information. The programming system of the data recorder provides all of the automatic features available in card punch machines and performs all functions hundreds of times faster. Duplication of information common to a number of unit records occurs at microseconds per column speed from program or operator control. This speed, like the speed of skipping and automatic verification, contributes greatly to the overall high speed operation of the machine further enchances the operation's ability to keep key stroke rhythm even and easy.

The correction of errors which are sensed as soon as they are made has always been a problem for users of card punch machines. The operator knows the error exists but a nonerasable hole has been punched. In a data recorder of the type described, the problem can be corrected quickly and easily since the operator needs only to backspace and key in the correct data. This is possible because keyboard entries always go first to a correctable electronic memory and then to the record type.

Very briefly, the data recorder in which the invention is utilized includes a keyboard which permits entry of 63 different character codes including alphabet, numerics and special characters. The output media is in the form of a seven channel magnetic tape, and up to 80 data characters can be recorded in each unit record. A magnetic core memory is used to store data to be recorded in a unit record during a recording run, and also to store program patterns. In the entry mode, keyed data is entered into memory until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator.

As described in above-mentioned parent application Ser. No. 541,450, the recording system in which the present invention is designed to operate employs the so-called "self-sprocketing" technique for reading data characters from the tape, both during the read-after-write check cycle executed after recordation of a data block in the entry mode and during the read-into-memory cycle executed in the verification mode. This technique eliminates the need for a separate track of clock pulses on the tape since the data bits themselves are used to trigger each character read cycle. This is done by using the pulse (TINFO) generated by the first-sensed data bit in a character to initiate a predetermined time interval during which the read register is gated open to receive the data pulses.

As also described in the parent application, read cycles are performed a data block at a time. That is to say, tape motion is terminated after reading of each complete 81 character data block (80 data characters and 1 parity character). The individual data blocks are identified on the tape only by the presence of an inter-record gap, there are no special end-of-block or beginning-of-block characters on the tape. Therefore, the system can delineate read cycles only by counting 81 consecutive character inputs. It is therefore extremely important that the system include adequate safeguards to prevent the situation where, through tape errors, a portion of one data block is run together with a portion of the next data block to result in an erroneous read cycle. For example, if dust on the tape surface or a crimp therein obscured the reading of the last 24 characters of a data block, some error detection means must be provided to stop tape advance and give an error signal before the first 24 characters of the next block are mistaken by the system for the characters which were dropped.

It is therefore an object of the invention to provide an improved error detection and control system for self-sprocketing tape reading apparatus.

A further object is to provide in a data recording and verifying machine an error detection and control system wherein the operator receives the same error indication, and can follow the same corrective procedure, regardless of whether the error indication is caused by blank tape, bad spots on the tape or actual error conditions in a written record. The operator, in other words, is not required to differentiate between the various conditions that can cause the error indication.

In accordance with a first aspect of the invention the tape advance mechanism is controlled by a drive signal having a predetermined maximum time length. If no data pulses are read from tape during the predetermined time, the signal terminates to stop the tape and means automatically responsive to this condition act to feed a series of "artificial" data pulses to the read cycle control circuits, simulating the reading of a complete data block whereupon the read cycle circuits operate to terminate the cycle in the usual manner and provide an error indication.

In accordance with a second aspect of the invention, the means for generating artificial data read pulses operates during any read cycle to automatically fill in data pulses which the read circuits may have omitted (either through erroneous reading or because of a previous erroneous recording operation) from the end of a data block so that the read cycle control circuits terminate the cycle and signal an error before the next data block comes under the read heads.

These and other objects, features and advantages will be made apparent by the following detailed description of a preferred embodiment of the invention, the description being supplemented by drawings as follows.

Figure 1:
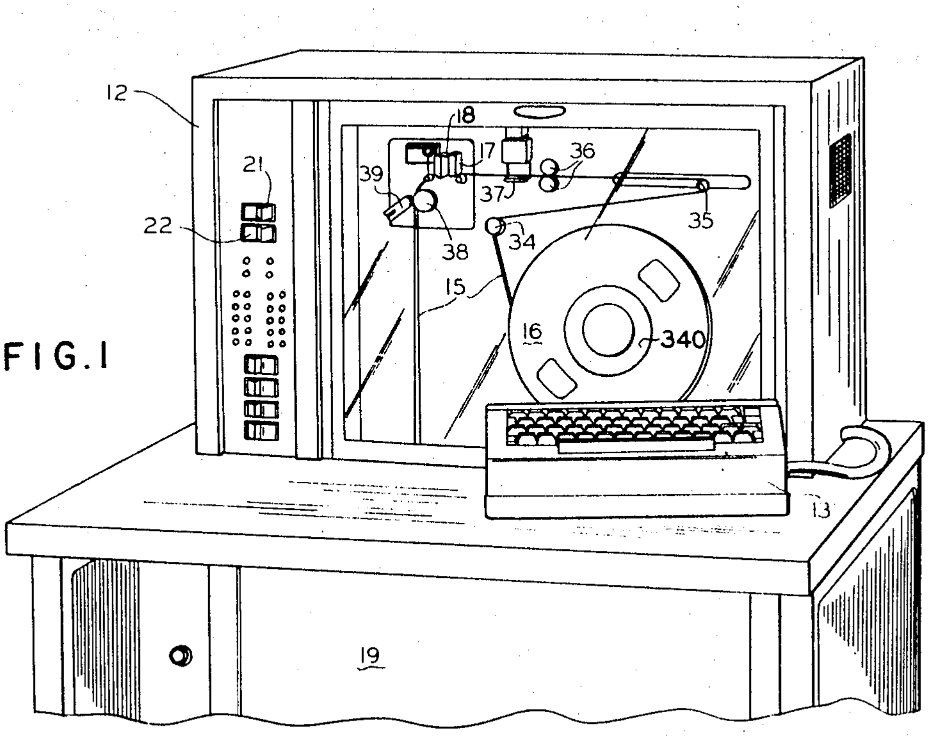
FIG. 1 is a perspective view of the tape handling mechanism of the preferred embodiment.

Before describing in detail the system for generating artificial tape sprockets or drive signals, it should be explained that the tape motion control flip-flops, described fully in parent application Ser. No. 541,450, are normally reset by a sequence which depends on reading tape sprockets, it being necessary to have 81 such sprockets per record in order to complete a tape cycle. Normally, a "1" in any channel of a data character frame on tape will produce a tape sprocket, and a sprocket produced in this manner will hereinafter be referred to as a normal tape sprocket. In the artificial sprocket generating system, means are provided so that if a normal sprocket does not appear within 900 microseconds after the last sprocket was read, an artificial sprocket will be generated. For the generation to occur, however, there must be at least one input sprocket.

If the machine attempts to read blank tape, as for example the first part of a tape that has been put in the data recorder to be verified, the tape may move forward 3.5 inches and stop within there being any normal tape sprockets for the machine to read. In such case, a trailing edge differentiator in the pinch roll drive circuit forces an input into the read amplifiers which causes a tape sprocket to be produced. This initial tape sprocket activates the artificial sprocket generating system since a normal sprocket will not be encountered in the ensuing 900 microseconds. Therefore, the system generates an artificial sprocket and this will continue until a total of 81 sprockets have been read. The generation of the sprockets in this manner completes the tape read cycle but results in a parity error and the error condition is indicated to the operator by the machine.

The error condition will be indicated by the control panel lights. Thus, the normally lighted READY light will be extinguished and the release lockout (REL L/0) will be lighted together with one or both of the other two lights. When the operator sees this error indication she always follows the same procedure which is to backspace and release. Backspacing is accomplished by depressing the tape backspace (TBS) key while holding the error release or key depressed and results in the tape being moved back approximately 1.125 inches. Thereafter the release (REL) key is depressed which causes the tape to move forward for another increment of up to 3.5 inches while its contents, if any, are sensed by the read head 18. These various lights and keys are not herein described in detail since they do not relate directly to the present invention. Such a description is, however, available in the above-mentioned parent application.

Moving the tape forward another increment will probably bring a record into position so that it can be read in the usual way without an error condition. If, on the other hand, the tape continues to be blank throughout the full 3.5 inches of possible movement, the pinch roll circuit will again initiate the generation of artificial tape sprockets as above described. Another possibility is that the forward movement of the tape will terminate while a record is being read. In such case, even though no further normal tape sprockets appear, an artificial sprocket will be generated 900 microseconds after the last normal sprocket and this process will continue until the tape read cycle has been completed.

Completion of the tape read cycle by the generation of artificial tape sprockets will result in an error condition that will be indicated to the operator in the manner described just above. The operator will, therefore, backspace and release which will insure that the entire record will be read on the next forward movement of the tape.

If the tape being read contains previously encountered and erased bad spots whereby the tape movement terminates before reaching a record or in the midst of reading a record, the operation of the machine, the error indication and the procedure followed by the operator will be exactly the same as in the case of blank tape. On the other hand, if the tape bad spot occurs in the middle of a record that is being read on a read after write check, for example, the bad spot could cause either a noncompare or a parity error or both. In such case, the error indicated will be the same as previously described but because the bad spot is in the middle of an otherwise properly record, a backspace and release by the operator will only result in the same record being read again with another error indication.

After this has happened several times with an error, indication each time, the operator will follow a modified procedure consisting of backspacing, depressing the tape erase forward (TEF) key and thereafter the release (REL) key. The backspace will move the tape back 1.125 inches but the tape erase forward will move the tape forward approximately 3.5 inches erasing the error record and positioning the tape for rewriting the block at a new location. Accordingly, when the release key is depressed the contents of memory will again be written as a data record in the new tape location and thereafter will again be automatically checked.

Another situation in which the system for generating artificial tape sprockets is utilized is that in which a record has no 1 bits in its longitudinal parity frame. In reading such a record, there would not be a normal 81 st tape sprocket and therefore the tape read cycle could not be completed. Moreover, without the 81 st tape sprocket, the machine could not check for correct longitudinal parity. In a situation of this kind, the lack of a normal tape sprocket after the 80th tape sprocket would result in the generation of an artificial tape sprocket after 900 microseconds and this would then permit completion of the tape read cycle in the normal manner.

The tape handling mechanism is shown in FIG. 1. It is mounted upright in an enclosure 12 atop an operator console 19. A tape supply reel 16 is clamped to a drive hub 340 and supplies tape to the tape path. The tape 15 passes over an idler roll 34 and a tension control roller 35, through a pair of backspace feed wheels 36, a drag pad 37, past the read-write-erase heads 17—18 and is gripped between a pinch roll 39 and drive capstan 38 for feeding. Fed tape is stored in a collection bin in console 19.

Figure 2:
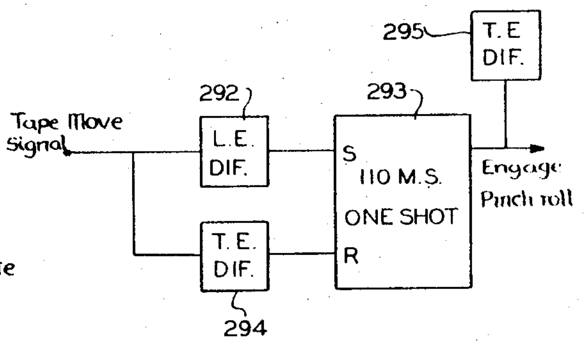
FIG. 2 is a schematic circuit diagram of the timed tape advance drive control circuit.

The operation of the timed pinch roll drive circuit that controls the forward movement of the tape is described with reference to the simplified logic diagram of FIG. 2. The drive circuit is activated by a move tape signal supplied from external machines control circuits. When a move tape signal occurs, the leading edge is differentiated by differentiator 292 which sets a 110 millisecond "one shot" delay flop 293. Setting the delay flop 293 causes the pinch roll (FIG. 1) to engage capstan 38 and move the tape forward.

In the absence of another signal, the pinch roll will remain engaged with the capstan for 110 milliseconds and cause the tape to move forward approximately 3.5 inches, the distance being governed by the design of the tape handling mechanism, as well as the time factor. At the end of 110 milliseconds, the one shot delay flop automatically resets disengagement of the pinch roll.

In a normal tape read, without an error condition, the duration of the move tape signal will be far less than 100 milliseconds and its trailing edge will be differentiated by differentiator 294 which forces the delay flop 293 to reset short of its own delay period. The pinch roll is thus caused to disengage, usually after moving the tape approximately 1.125 inches. It will be understood, therefore, that the one shot delay flop provides an emergency shut off for the error conditions described just above when there is noting on the tape to cause normal termination of the move tape signal. Such an emergency shut off is highly desirable because it prevents runaway and the resultant complications when error conditions do occur.

Forming a part of the pinch roll drive circuit is a differentiator 295 which forces an input signal into the read amplifiers upon differentiating the trailing edge of the pinch roll drive signal. The function of this signal will be described in more detail in connection with the circuit for generating artificial tape sprockets.

Figure 3:
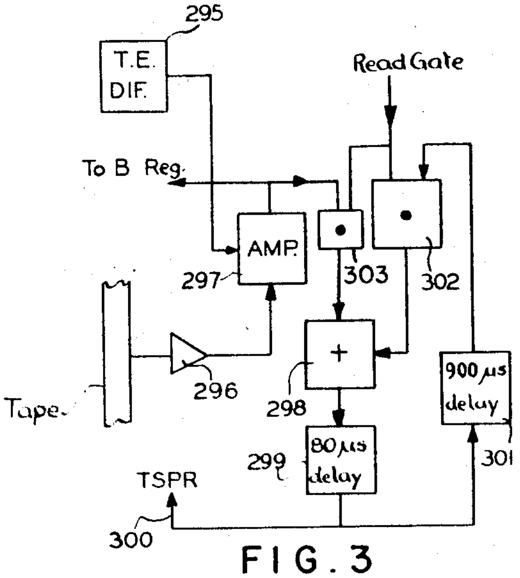
FIG. 3 is a schematic circuit diagram of the circuit for generating tape sprocket signals in response to either real or artificial data pulses.

The tape sprocket circuit, including path for generating and regenerating artificial tape sprockets, is shown diagrammatically in FIG. 3. In a normal tape read, data on the tape is sensed by the read head 296 and fed into the read amplifiers indicated at 297. As described above in connection with the tape cycle portion of the entry mode, when the first bit in each frame is read from tape and transferred to the read register it also causes the generation of a TINFO signal which, after the deskew delay period, initiates normal tape sprockets. What happens to the tape data after being transferred to the read register is not further described herein since it is not directly pertinent to the present invention. However, full description of the read cycle is given in parent application Ser. No. 541,450. The TINFO signal that is generated goes from the output of the read amplifiers via an "AND" gate 303 to one of the two inputs of an "OR" gate 298. The output of gate 298 passes through a network 299 which causes the deskew delay, and at the end of the delay period tape sprockets are initiated.

If, as described above, the forward movement of the tape should terminate while a record is being read, no further normal tape sprockets will appear at the output point 300 of the tape sprocket circuit. When this happens, a second delay network 301 will generate a signal 900 microseconds after the last normal sprocket. Delay circuit 301 is reset by each output from circuit 299. That is the delay interval timed by circuit 301 is restarted by each normal TSPR signal so that no output is generated by circuit 301 during a normal read cycle since normal TSPR signals occur less than 900 microseconds apart. The signal from the network 301 is one of the two inputs to an "AND" gate 302, the output of which becomes true by reason of the read gate being active. The latter is still active, even though the tape has come to a stop, because 81 TINFO signals have not been produced. The output of gate 302 provides a permissive input for the "OR" gate 298 whereby an artificial tape sprocket is generated. This process will continue until the tape cycle has been completed.

If the tape is completely blank so that there are no natural tape sprockets at all, when the pinch roll drive stops the differentiator 295 will force a signal into each of the read amplifiers and the output generates a TINFO signal which is fed into gate 298 so that tape sprockets are initiated as above described. The TINFO signal that is created by the trailing edge of the pinch roll one shot 293, is not effective in the normal cause because it occurs after the read gate becomes inactive. After a TINFO has been produced by differentiator 295, repetitive tape sprockets will thereafter be generated at 980 microsecond intervals until the tape read cycle has been completed. It will be appreciated that various changes in the form and details of the above described preferred embodiment may be effected by persons of ordinary skill without departing from the true spirit and scope of the invention.

What we claim is:

1. In a data recording machine of the character described including a tape drive means and a timed drive circuit for said drive means, said circuit being put into operation in response to a tape move signal and including a leading edge and a trailing edge differentiator for said signal, a one shot delay flop in said circuit having a predetermined delay period, said delay flop having set and reset input lines connected respectively to said leading edge and trailing edge differentiators, said delay flop having an output line operably connected to said tape drive means for supplying a signal thereto, said leading edge differentiator causing said delay flop to set when a tape move signal occurs whereby said tape drive means is activated, said drive means remaining in operation for the full delay period of said delay flop at the end of which the delay flop automatically resets and the drive means is deactivated, said trailing edge differentiator being operable, when the tape move signal is of shorter duration than the delay period of said delay flop, to differentiate the trailing edge of said signal and force the delay flop to reset short of its own period, said tape drive means being deactivated when said delay flop resets.

2. A machine as defined in claim 1 wherein said drive circuit includes a differentiator for differentiating the trailing edge of the delay flop output signal to said tape drive means.

3. In a data recording machine of the character described including a drive capstan and a pinch roll engageable with said capstan to effect forward movement of tape, a timed circuit for controlling the operation of said pinch roll comprising a one shot delay flop operable when set to supply a signal to said pinch roll to cause engagement of same with said capstan, means for supplying a tape move signal to said circuit during the tape cycle of the machine, means responsive to the leading edge of the tape move signal to set said delay flop means responsive to the trailing edge of the tape move signal to reset said delay flop, said delay flop being automatically reset after a fixed period in the absence of said trailing edge means forcing it to reset in a shorter period, and means for differentiating the trailing edge of the delay flop signal to said pinch roll.

4. In a data recording machine of the character described, a tape short circuit comprising read amplifiers for receiving signals produced when a "1" bit is sensed on tape, a first two input "AND" gate, signalling means operable when the machine is conditioned to read tape to provide a true signal to one input of said "AND" gate, the other input of said gate being connected to said amplifiers whereby the gate is made active when information is read from tape, a two input "OR" gate one input of which is connected to the output of said first "AND" gate, a first delay device connected to the output of said "OR" gate, said delay device producing tape sprockets at its output in response to signals received from said "OR" gate, a second delay device connected to the output of said first delay device, said second delay device being operable to generate a signal if said first delay device has not produced a tape sprocket after a fixed period of time, and a second two input "AND" gate, said tape read signal means being operable to provide a true signal to one input of said second "AND" gate, said second delay device being connected to the other input of said second "AND" gate, the output of said second "AND" gate being connected to the other input of said "OR" gate whereby the latter provides an artificial tape sprocket through said first delay device when said second "AND" gate becomes active.

5. A circuit as defined in claim 1 wherein the delay provided for by said second delay device is substantially longer than that provided for by said first delay device.

6. A circuit as defined in claim 4 wherein the delay of said first delay device is a nominal 80 microseconds and the delay of said second delay device is a nominal 900 microseconds.

7. A tape sprocket circuit as defined in claim 4 in combination with a timed drive circuit for supplying a control signal to the tape drive means, said timed drive circuit including a differentiator for differentiating the trailing edge of said control signal, said differentiator being operable to force a signal into read amplifiers whereby tape sprockets are produced by the tape sprocket circuit if said tape read signal means is applying a true signal to said first "AND" gate.

8. In a magnetic tape read system wherein a tape drive mechanism advances a tape past a station in response to a tape drive signal and wherein blocks of data on said tape are read during individual read cycles, each said cycle being determined by counting means arranged to count the number of characters read and to terminate the cycle after a predetermined number of characters have been read, the combination comprising:

first circuit means for generating a tape sprocket signal a first predetermined time interval after the first bit of each character is sensed, said tape sprocket signals causing advancement of said counting means;

timing means responsive to each said tape sprocket signal for initiating the timing of a second predetermined interval and for generating an output pulse at the termination of said second interval, said second interval being longer than the time between data characters in a normal read cycle; and second circuit means responsive to said output signal for generating additional tape sprocket signals, whereby the read cycle is terminated even through said predetermined number of characters is not included in a data block.

9. The system set forth in claim 8 further comprising:

a one shot multivibrator operable to terminate said tape drive signal after a third predetermined time interval substantially longer than said second interval; and means responsive to termination of said drive signal for causing said first circuit means to generate a tape sprocket signal to actuate said timing means.

PO-1050
(5/69)

UNITED STATES PATENT OFFICE
CERTIFICATE OF CORRECTION

Patent No. 3,585,619 Dated June 15, 1971

Inventor(s) George R. Cogar et al

It is certified that error appears in the above-identified patent and that said Letters Patent are hereby corrected as shown below:

In the Heading and in column 1, line 5:

The filing date of U. S. Patent No. 3,483,523 originally given as "March 30, 1966"

should read "March 3, 1966"

Signed and sealed this 1st day of May 1973.

(SEAL)
Attest:

EDWARD M. FLETCHER, JR
Attesting Officer

ROBERT GOTTSCHALK
Commissioner of Patents